United States Patent [19]

Bray et al.

[11] Patent Number: 5,105,885
[45] Date of Patent: Apr. 21, 1992

[54] WELL CEMENTING METHOD USING A DISPERSANT AND FLUID LOSS INTENSIFIER

[75] Inventors: Windal S. Bray, Cypress; William R. Wood, Rosegate Spring, both of Tex.

[73] Assignee: BJ Services Company, Houston, Tex.

[21] Appl. No.: 616,232

[22] Filed: Nov. 20, 1990

[51] Int. Cl.$^5$ .................... E21B 43/16; E21B 37/06
[52] U.S. Cl. .................................. 166/279; 166/293
[58] Field of Search ............... 166/279, 293, 294, 295

[56] References Cited

U.S. PATENT DOCUMENTS

| | | |
|---|---|---|
| 3,844,351 | 10/1974 | Sutton et al. ............ 166/293 |
| 4,209,336 | 6/1980 | Previte . |
| 4,351,671 | 9/1982 | Rosenberg et al. . |
| 4,398,958 | 8/1983 | Hodson et al. . |
| 4,488,910 | 12/1984 | Nicholson et al. . |
| 4,588,032 | 5/1986 | Weigand et al. . |
| 4,676,317 | 6/1987 | Fry et al. . |
| 4,986,353 | 1/1991 | Clark et al. ............ 166/279 |
| 4,986,354 | 1/1991 | Cantu et al. ............ 166/279 |

Primary Examiner—William P. Neuder
Attorney, Agent, or Firm—Charles D. Gunter, Jr.

[57] ABSTRACT

A fluid loss and dispersant intensifier and method are shown for use in cementing oil and gas well bores. The intensifier includes an ethoxylate and a sulfonated dispersant type material. The intensifier package provides effective fluid loss control without adversely affecting the viscosity of the cement slurry.

18 Claims, No Drawings

WELL CEMENTING METHOD USING A DISPERSANT AND FLUID LOSS INTENSIFIER

BACKGROUND OF THE INVENTION

1. Field of the Invention

This invention relates generally to oil and gas well cementing compositions and methods and specifically to an additive package which achieves a highly dispersed, low fluid loss cement composition during placement thereof.

2. Description of the Prior Art

Cement compositions are used in the oil and gas industry to cement the annular space in the well bore between the surrounding formation and the pipe or casing. Typically the cement slurry is pumped down the inside of the casing and back up the outside of the casing through the annular space. The amount of water which is used in forming the cement slurry will vary depending upon the type of hydraulic cement selected and the job conditions at hand. The amount of water used can vary over a wide range, depending upon such factors as the required consistency of the slurry and upon the strength requirement for a particular job. Many times, the hydraulic cement must be placed within or next to a porous medium, for example earthen strata in the well bore. When this happens, water tends to filter out of the slurry and into the strata during placement and setting of the cement. Many difficulties are related to an uncontrolled fluid loss of this type, such as an uncontrolled setting rate, improper placement of the slurry, impaired strength properties, and a contamination of the surrounding strata. These conditions are all undesirable in oil and gas well cementing operations.

In order to lessen the fluid loss from the aqueous cement slurry, various materials have been employed in the past. Known fluid loss additives utilized in cement compositions include cellulosic materials, polysaccharides, polyacrylamides, polyvinyl alcohol, polymethacrylates, polyamines, and polyvinylpyrrolidone. Known cellulosic fluid loss materials include, for example, methylcellulose, carboxymethylcellulose, hydroxyethylcellulose, hydroxymethylcellulose, carboxymethylhydroxyethylcellulose, natural starches and mixtures thereof. The polyamine materials include the polyalkylenepolyamines, polyalkylenimines, and mixtures thereof.

Various ethoxylates have also been used in the past in cementing slurries, mainly to reduce air entrainment. See, for example, U.S. Pat. No. 4,351,671, to Rosenberg et al., issued Sep. 28, 1982, in which an ethoxylated nonylphenol is added to a cement slurry containing a lignin type water reducing agent to reduce air entrainment.

U.S. Pat. No. 4,209,336, to Previte, issued June 24, 1980, teaches the addition of non-ionic surface active condensation products of octylphenol or nonylphenol with ethylene oxide as compressive strength enhancing additives for hydraulic cement compositions.

U.S. Pat. No. 4,398,958 teaches the use of a non-ionic surfactant such as an ethoxylated primary or secondary alcohol or a nonylphenol-ethylene oxide condensate additive to ensure proper distribution of expanded polystyrene beads in a lightweight concrete.

We have discovered that the addition of selected ethoxylates surprisingly and unexpectedly improves the fluid loss and dispersant qualities of oil and gas well cementing slurries while maintaining favorable suspension properties. Specifically, the ethoxylates included in the additive package of the invention decrease the viscosity of certain cement slurries while also decreasing fluid loss.

SUMMARY OF THE INVENTION

A method is shown for cementing a well bore in which a hydraulic cement, water and an additive package are combined. The combined slurry is then pumped to the desired location in the well bore and the cement slurry is allowed to harden to a solid mass. The additive package includes a selected ethoxylate used in conjunction with a dispersant type material. The preferred ethoxylates include ethoxylated alkylphenols, ethoxylated fatty alcohols, ethoxylated amines, ethoxylated amides, ethoxylated fatty acids, ethoxylated diamines and ethoxylated quarternary ammonium chlorides. The dispersant material is preferably a sulfonated dispersant type material such as an anionic surface active agent of the sulfonated naphthalene type. The cement slurry can also have added thereto a water soluble polymeric compound or compounds which act as a fluid loss additive, such compounds including hydroxy-ethylcellulose, carboxymethylhydroxyethylcellulose, polyvinyl alcohol, polyvinylpyrollidone, or a copolymer or terpolymer of 2-acrylamido, 2-methyl propane sulfonic acid/acrylamide/vinylmethyl acetamide. Sodium silicate can be used to strengthen the dispersive and fluid loss characteristics of the slurry. The ethoxylate is preferably present in the range from about 0.1 to 1.0% by weight of the cement.

Additional objects, features and advantages will be apparent in the written description which follows.

DETAILED DESCRIPTION OF THE INVENTION

The term "hydraulic cement" is meant to encompass any cement that hardens or sets under water. Hydraulic cements, for example, include Portland cement, aluminous and pozzolan cements, and the like. The term "hydraulic cement" is also intended to include cements having minor amounts of extenders, such as bentonite, sodium silicate, and also is intended to include cements used either without any appreciable sand or aggregate material, or such cements admixed with a granular filling material, such as sand, ground limestone, and the like. Thus, for example, any of the class "A to H" cements as listed in the API Spec 10, Second Edition, June 1984 are suitable for this purpose. The strength enhancers such as silica powder can also be employed.

Mixing water is utilized with the dry cement composition to produce a fluid pumpable slurry of suitable consistency. API Spec 10, Second Edition, June 1984 which is known in the cement industry, describes an approved apparatus and method for measuring the consistency of cement slurries in terms of Bearden units of consistency (Bc). A pumpable slurry should measure in the range from about 2–20 Bc and preferably be in the range from about 5 to 11 Bc. Slurries thinner than about 5 Bc will tend to have greater particle settling and free water generation. Slurries thicker than about 20 Bc become increasingly difficult to mix and pump.

Depending upon the particular slurry and intended conditions of use, mixing water is utilized in the slurry of the present invention in the range from about 30 to 150 weight percent based upon the dry weight of cement and preferably is in the range of about 35 to 90 weight percent.

The present cement compositions, in addition to hydraulic cement and water in a sufficient amount to produce a pumpable slurry, include an intensifier additive package. The intensifier additive package includes a selected ethoxylate and at least a dispersant type material. The preferred ethoxylate is an ethoxylated surfactant selected from the group consisting of ethoxylated alkylphenols, ethoxylated fatty alcohols, ethoxylated amines, ethoxylated amides, ethoxylated fatty acids, ethoxylated diamines and ethoxylated quarternary ammonium chlorides.

The ethoxylated alkyl phenols are commercially available, non-ionic surfactants prepared by condensing an alkyl phenol, for instance octylphenol or nonylphenol with a varying number of moles of ethylene oxide. The preferred ethoxylated alkyl phenols have the general formula:

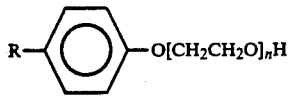

in which R is octyl or nonyl and n is in the range from about 1.5 to 150. The ethoxylated alkylphenol is preferably present in the range from about 0.1 to 1.0% by weight of cement.

The ethoxylate can also be an ethoxylated primary or secondary alcohol, or an ethoxylated fatty alcohol of the general formula:

RO[CH$_2$CH$_2$O]$_n$H in which R has about 12 to 28 carbon atoms and n is in the range from about 2 to 80.

Preferably, the primary or secondary alcohols contain from about 3 to about 18 carbon atoms ethoxylated with 2 to 80 moles of ethylene oxide. Examples of preferred alcohols include n-propyl, isopropyl, n-butyl, isobutyl, sec-butyl, tert-butyl, n-pentyl, isopentryl, tert-pentyl, n-hexyl, n-heptyl, n-octyl alcohols, 2 methyl-1-butanol, and the like. Also included among the preferred fatty alcohols are fatty alcohols with carbon chain lengths of about 16 to 18. The ethoxylated alcohol component is preferably present in the range from about 0.1 to 1.0% by weight of cement.

The preferred ethoxylated amines have the general formula:

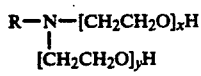

where x+y is in the range from about 2 to 50 and R has about 1 to 28 carbons in the carbon chain.

The preferred ethoxylated amines include, for example, polyoxyethylene (15) talloamine, polyoxyethylene (10) aliphatic N-tallow-1,3-diaminpropane, polyoxyethylene (10) cocoamine, polyoxyethylene (10) octadecylamine, polyoxyethylene (10) soyamine, polyoxyethylene (15) aliphatic oleylamine, and polyoxyethylene (25) stearylamine. The ethoxylated amine can be present in the range from about 0.1 to 1.0% by weight of cement.

Other preferred ethoxylates include those having the following structural formulas:

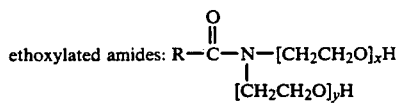

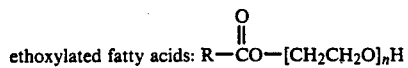

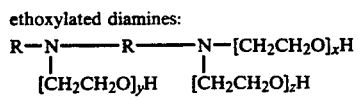

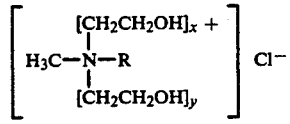

In each of the above cases, x+y is preferably in the range from about 2 to 50 and R has about 1-28 carbons.

Preferred amides include polyoxyethylene (7) oleamide and polyoxyethylene (5-50) talloamide. Preferred ammonium chlorides include methylpolyoxyethylene (15) cocoammonium chloride, methylpolyoxyethylene (15) octadecylammonium chloride, and methylpolyoxyethylene (15) oleylammonium chloride. The ethoxylate or ethoxylate mixture is present in the range from about 0.1 to 1.0%, by weight of cement.

The intensifier package also includes a dispersant, companion material for the selected ethoxylate. By "dispersant" material is meant an anionic surface active agent of the sulfonated naphthalene type. Such materials are typically lower molecular weight materials with molecular weights ranging from about 1000 to 10,000. A 95% active powder is available under the trademark LOMAR D and is known in the industry. The dispersant type material is preferably present in the range from about 0.1 to 2.0% by weight of cement.

The intensifier package can also be used with one or more water soluble polymeric compounds which can be present alone or blended to form a fluid loss blend. The preferred water soluble polymeric compounds include one or more of the cellulosic fluid loss materials selected from the group consisting of: methylcellulose, carboxymethylcellulose, hydroxyethylcellulose, hydroxymethylcellulose, carboxymethylhydroxyethylcellulose, natural starches and mixtures thereof. The preferred water soluble polymeric compounds can also be selected from the group consisting of polysaccharides, polyacrylamides, polyvinyl alcohol, polymethacrylates, polyamines and polyvinylpyrrolidone. Copolymers or terpolymers of 2-acrylamido, 2-methyl propane sulfonic acid/acrylamide/vinylmethyl acetamide are also known as fluid loss additives for oil well cements and can be utilized with the intensifier package of the invention. A particularly preferred water soluble polymeric compound is polyvinyl alcohol.

The fluid loss additive or additive blend is generally present in the range from about 0.1 to 2.0% by weight of cement.

Under some conditions, a silica material, preferably sodium silicate, can be used to strengthen the dispersive and fluid loss characteristics of the cement slurries of the invention. The sodium silicate is preferably present in the range from about 0.1 to 1.0% by weight of cement.

In the method of cementing a well bore with the intensifier package, a hydraulic cement, water and other additives are mixed together to form a pumpable slurry. The intensifier package is generally present in the slurry in the range from about 0.1 to 3.0% by weight of cement and preferably in the range from about 0.1 to 1.5% by weight of dry cement. The cement slurry so prepared is then pumped to the desired location in the well bore and allowed to harden to form a solid mass.

The following examples are intended to be illustrative of the invention. The abbreviations used in the tables have the following meanings:
PPG—pounds per gallon
GPS—gallons per sack
DIS—sulfonated naphthalene type dispersant
PVA—polyvinyl alcohol
LCA—long chain alcohol defoamer
Ethox—ethoxylate additive
TT—thickening time in hours
FL—fluid loss in milliliters
AC—aluminum chlorohydrate
SM—sodium metasilicate
HEC—hydroxyethyl cellulose
FLA—blended fluid loss additive containing HEC, naphthalene sulfonic acid and polyvinylpyrollidone
FLB—blended fluid loss additive containing PVA, HEC, naphthalene sulfonic acid famaldehyde condensate and polyvinyl alcohol
FLC—2-acrylamide, 2-methyl propane sulfonic acid/acrylamide/vinyl methyl acetamide fluid loss additive
CMHEC—carboxymethyl hydroxyethyl cellulose
KCl—potassium chloride
NaCl—sodium chloride
FLD—blended fluid loss additive containing DIS, polyoxyethylene (25) stearylamine and LCA
FLE—blended fluid loss additive containing DIS, polyoxyethylene (15) tallowamine and LCA
TFR—turbulent flow rate
RUN 1—6.5" hole; 5.5" casing
RUN 2—6" hole; 4.5" casing Standard API viscosity and fluid loss tests were conducted on the cement slurries.

TABLE 1

| | Cement Class | Den. PPG | Water GPS | Temp °F. | Additives DIS | PVA | LCA | Ethox Additive | TFR 1 | TFR 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | — | — | — | — | — | — | — | — | 96 | 61 | 53 | 41 | 22 | 13 |
| RUN 2 | G | 15.8 | 4.89 | 120 | — | — | — | — | 8.03 | 9.47 | 2:13 | 1100+ | 84 | 61 | 54 | 44 | 15 | 8 |

Comments:
Base cement slurry for comparison.

TABLE 2

| | Cement Class | Den. PPG | Water GPS | Temp °F. | Additives DIS | PVA | LCA | Ethox Additive | TFR 1 | TFR 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 0.7 | 0.4 | 0.2 | — | — | — | — | — | 159 | 99 | 77 | 49 | 30 | 28 |
| RUN 2 | G | 15.8 | 4.89 | 120 | 0.7 | 0.4 | 0.2 | — | 6.99 | 6.58 | — | 622 | 126 | 81 | 64 | 44 | 20 | 15 |

Comments:
Slurry was difficult to mix and exhibited high gel strengths.

TABLE 3

| | Cement Class | Den. PPG | Water GPS | Temp °F. | Additives DIS | PVA | LCA | Ethox Additive | TFR 1 | TFR 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 0.8 | 0.4 | 0.2 | — | — | — | — | — | 161 | 90 | 63 | 35 | 5 | 4 |
| RUN 2 | G | 15.8 | 4.89 | 120 | 0.8 | 0.4 | 0.2 | — | 6.24 | 6.30 | 4:14 | 520 | 130 | 84 | 63 | 43 | 33 | 25 |

Comments:
Although this slurry had lower primary gel strengths, it was still difficult to mix, and were unable to maintain a vortex. This slurry also gelled with increased temperature.

TABLE 4

| | Cement Class | Den. PPG | Water GPS | Temp °F. | Additives DIS | PVA | LCA | Ethox Additive | TFR 1 | TFR 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 0.8 | 0.3 | 0.2 | — | — | — | — | — | 131 | 98 | 75 | 54 | 31 | 28 |
| RUN 2 | G | 15.8 | 4.89 | 120 | 0.8 | 0.3 | 0.2 | — | — | — | — | 646 | 130 | 86 | 69 | 48 | 19 | 13 |

Comments:
This slurry was difficult to mix and exhibited high gel strengths.

TABLE 5

| | Cement Class | Den. PPG | Water GPS | Temp °F. | Additives DIS | PVA | LCA | Ethox Additive | TFR 1 | TFR 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 0.8 | 0.325 | 0.2 | — | — | — | — | — | 152 | 95 | 72 | 47 | 27 | 25 |

TABLE 5-continued

| Cement Class | Den. PPG | Water GPS | Temp °F. | Additives DIS | PVA | LCA | Ethox Additive | TFR 1 | 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|
| RUN 2 | G | 15.8 | 4.89 | 120 | 0.8 | 0.325 | 0.2 | — | — | — | — | 522 | 126 | 89 | 72 | 52 | 22 | 18 |

Comments:
This slurry was difficult to mix and exhibited high gel strengths.

TABLE 6

| Cement Class | Den. PPG | Water GPS | Temp °F. | Additives DIS | PVA | LCA | Ethox Additive | TFR 1 | 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|
| RUN 1 | G | 15.8 | 4.89 | 80 | 0.9 | 0.325 | 0.2 | — | — | — | — | — | 126 | 95 | 76 | 55 | 39 | 26 |
| RUN 2 | G | 15.8 | 4.89 | 120 | 0.9 | 0.325 | 0.2 | — | — | — | — | 557 | 114 | 81 | 65 | 46 | 18 | 13 |

Comments:
This slurry was difficult to mix and exhibited high gel strengths.

TABLE 7

| Cement Class | Den. PPG | Water GPS | Temp °F. | Additives DIS | PVA | LCA | Ethox Additive | TFR 1 | 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|
| RUN 1 | G | 15.8 | 4.89 | 80 | 0.7 | 0.4 | 0.2 | 0.1* | — | — | — | — | 127 | 70 | 50 | 29 | 11 | 11 |
| RUN 2 | G | 15.8 | 4.89 | 120 | 0.7 | 0.4 | 0.2 | 0.1* | 5.13 | 5.45 | — | 465 | 94 | 64 | 55 | 41 | 29 | 18 |

*Comments:
The addition of 0.1% ethoxylated nonylphenol improved mixing and lowered fluid loss.

TABLE 8

| Cement Class | Den. PPG | Water GPS | Temp °F. | Additives DIS | PVA | LCA | Ethox Additive | TFR 1 | 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|
| RUN 1 | G | 15.8 | 4.89 | 80 | 0.7 | 0.4 | 0.2 | 0.2* | — | — | — | — | 121 | 70 | 50 | 29 | 3 | 2 |
| RUN 2 | G | 15.8 | 4.89 | 120 | 0.7 | 0.4 | 0.2 | 0.2* | 4.00 | 3.74 | — | 247 | 76 | 43 | 31 | 17 | 6 | 6 |

*Comments:
The addition of 0.2% ethoxylated nonylphenol improved mixing, did not viscosify with temperature and reduced fluid loss.

TABLE 9

| Cement Class | Den. PPG | Water GPS | Temp °F. | Additives DIS | PVA | LCA | Ethox Additive | TFR 1 | 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|
| RUN 1 | G | 15.8 | 4.89 | 80 | 0.8 | 0.4 | 0.2 | — | — | — | — | — | 161 | 90 | 63 | 35 | 5 | 4 |
| RUN 2 | G | 15.8 | 4.89 | 120 | 0.8 | 0.4 | 0.2 | — | 6.24 | 6.30 | 4:14 | 520 | 130 | 83 | 63 | 43 | 33 | 25 |

Comments:
Even with increased dispersant, the slurry was hard to mix and viscosified with temperature.

TABLE 10

| Cement Class | Den. PPG | Water GPS | Temp °F. | Additives DIS | PVA | LCA | Ethox Additive | TFR 1 | 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|
| RUN 1 | G | 15.8 | 4.89 | 80 | 0.8 | 0.4 | — | 0.2* | — | — | — | — | 112 | 59 | 40 | 22 | 3 | 2 |
| RUN 2 | G | 15.8 | 4.89 | 120 | 0.8 | 0.4 | — | 0.2* | 3.77 | 3.43 | 3:05 | 30 | 73 | 39 | 28 | 16 | 4 | 3 |

*Comments:
Addition of 0.2% ethoxylated nonylphenol with no defoamer added.

TABLE 11

| Cement Class | Den. PPG | Water GPS | Temp °F. | Additives DIS | PVA | LCA | Ethox Additive | TFR 1 | 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|
| RUN 1 | G | 15.8 | 4.89 | 80 | 0.8 | 0.4 | — | 0.2* | — | — | — | — | 112 | 57 | 40 | 21 | 3 | 2 |
| RUN 2 | G | 15.8 | 4.89 | 120 | 0.8 | 0.4 | — | 0.2* | 4.16 | 3.70 | 3:29 | 31 | 82 | 42 | 29 | 16 | 2 | 1.5 |

*Comments:
Addition of 0.2% ethoxylated octylphenol with no defoamer.

TABLE 12

| Cement Class | Den. PPG | Water GPS | Temp °F. | Additives DIS | PVA | LCA | Ethox Additive | TFR 1 | 2 | TT HRS | FL MLS | Rheology (Fann Viscometer at 80 and 120° F.) 600 | 300 | 200 | 100 | 6 | 3 |
|---|---|---|---|---|---|---|---|---|---|---|---|---|---|---|---|---|---|
| RUN 1 | G | 15.8 | 4.89 | 80 | 0.8 | 0.4 | — | 0.2* | — | — | — | — | 102 | 52 | 35 | 18 | 2 | 1 |
| RUN 2 | G | 15.8 | 4.89 | 120 | 0.8 | 0.4 | — | 0.2* | 3.41 | 3.06 | 4:02 | 20 | 68 | 34.5 | 24 | 13 | 2 | 1.5 |

*Comments:
Addition of 0.2% ethoxylated fatty alcohol.

TABLE 13

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 150° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 0.85 | 0.5 | — | 0.2* | — | — | — | — | — | 140 | 71 | 50 | 25 | 3 | 2 |
| RUN 2 | G | 15.8 | 4.89 | 150 | 0.85 | 0.5 | — | 0.2* | — | 3.65 | 3.28 | — | 54 | 69 | 37 | 26 | 14 | 2 | 2 |

Comments:
By increasing the fluid loss additive and dispersant slightly, the data generated at 120° F. was duplicated using the ethoxylated nonylphenol.

TABLE 14

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 150° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 0.85 | 0.5 | — | 0.2* | — | — | — | — | — | 142 | 74 | 51 | 27 | 3 | 2 |
| RUN 2 | G | 15.8 | 4.89 | 150 | 0.85 | 0.5 | — | 0.2* | — | 3.76 | 3.37 | — | 40 | 73 | 38 | 27 | 14 | 2 | 2 |

Comments:
The same test was duplicated using the ethoxylated octylphenol.

TABLE 15

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 150° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 0.85 | 0.5 | — | 0.2* | — | — | — | — | — | 130 | 66 | 45 | 24 | 3 | 2 |
| RUN 2 | G | 15.8 | 4.89 | 150 | 0.85 | 0.5 | — | 0.2* | — | 3.76 | 3.38 | — | 44 | 72 | 38 | 27 | 15 | 2 | 2 |

*Comments:
The same test was duplicated using the ethoxylated fatty alcohol.

TABLE 16

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 175° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 0.95 | 0.6 | — | 0.2* | — | — | — | — | — | 159 | 88 | 60 | 32 | 3 | 2 |
| RUN 2 | G | 15.8 | 4.89 | 175 | 0.95 | 0.6 | — | 0.2* | — | 3.92 | 3.56 | — | 30 | 72 | 40 | 29 | 17 | 3 | 2 |

*Comments:
Increasing the fluid loss and dispersant allowed the temperature to be raised to 175° F., and the data was again duplicated using ethoxylated nonylphenol. The base slurries without any of the ethoxylates were run, and again the high viscosities prohibited the generation of data.

TABLE 17

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 175° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 0.95 | 0.6 | — | 0.2* | — | — | — | — | — | 161 | 87 | 60 | 32 | 4 | 2 |
| RUN 2 | G | 15.8 | 4.89 | 175 | 0.95 | 0.6 | — | 0.2* | — | 3.92 | 3.60 | — | 39 | 74 | 41 | 29 | 17 | 4 | 4 |

*Comments:
Addition of 0.2% ethoxylated octylphenol.

TABLE 18

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 175° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 0.95 | 0.6 | — | 0.2* | — | — | — | — | — | 152 | 80 | 55 | 29 | 3 | 2 |
| RUN 2 | G | 15.8 | 4.89 | 175 | 0.95 | 0.6 | — | 0.2* | — | 3.48 | 3.17 | — | 30 | 68 | 36 | 25 | 14 | 3 | 3 |

*Comments:
Addition of 0.2% ethoylated fatty alcohol.

TABLE 19

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 200° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 1.05 | 0.7 | — | 0.2* | — | — | — | — | — | 191 | 107 | 74 | 39 | 4 | 5 |
| RUN 2 | G | 15.8 | 4.89 | 200 | 1.05 | 0.7 | — | 0.2* | — | — | — | — | — | — | — | — | — | — | — |

*Comments:
With the addition of 0.2% ethoxylated nonylphenol, this slurry was easily mixed at 80° F., but viscosified at 200° F., and the rheologies were unobtainable.

TABLE 20

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 200° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 1.05 | 0.7 | — | 0.5* | — | — | — | — | — | 178 | 92 | 64 | 34 | 3 | 2 |
| RUN 2 | G | 15.8 | 4.89 | 200 | 1.05 | 0.7 | — | 0.5* | — | 6.74 | 6.99 | — | — | 163 | 98 | 73 | 50 | 40 | 41 |

*Comments:
By increasing the ethoxylated nonylphenol to 0.5%, the rheologies were obtained, but the slurry still viscosified to an unacceptable level.

TABLE 21

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 200° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 1.20 | 0.7 | — | .25* | — | — | — | — | — | 220 | 120 | 84 | 45 | 5 | 3 |
| RUN 2 | G | 15.8 | 4.89 | 200 | 1.20 | 0.7 | — | .25* | — | 6.37 | 5.95 | — | — | 118 | 74 | 53 | 33 | 14 | 15 |

*Comments:
By increasing the dispersant and decreasing the ethoxylated nonylphenol, this slurry still viscosified with temperature.

TABLE 22

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 200° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 1.05 | 0.7 | — | .25* | 0.1 | — | — | — | — | 207 | 112 | 78 | 41 | 4 | 3 |
| RUN 2 | G | 15.8 | 4.89 | 200 | 1.05 | 0.7 | — | .25* | 0.1 | 6.46 | 6.05 | — | — | 115 | 76 | 54 | 34 | 15 | 16 |

*Comments:
With the addition of 0.1% sodium metasilicate with ethoxylated nonylphenol, the viscosity at temperature lessened, but the gels were unacceptable.

TABLE 23

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 200° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 1.05 | 0.7 | — | .25* | 0.2 | — | — | — | — | 215 | 120 | 83 | 45 | 5 | 3 |
| RUN 2 | G | 15.8 | 4.89 | 200 | 1.05 | 0.7 | — | .25* | 0.2 | 4.21 | 3.78 | — | 28 | 79 | 43 | 30 | 17 | 3 | 2 |

*Comments:
The addition of 0.2% sodium metasilicate to the above slurry decreased the rheologies and gels.

TABLE 24

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 200° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 1.05 | 0.6 | — | .25* | 0.2 | — | — | — | — | 176 | 93 | 65 | 35 | 4 | 3 |
| RUN 2 | G | 15.8 | 4.89 | 200 | 1.05 | 0.6 | — | .25* | 0.2 | 3.73 | 3.33 | — | 34 | 70 | 38 | 26 | 14 | 2 | 2 |

*Comments:
Decreasing the fluid loss additive to 0.6% while maintaining the ethoxylated nonylphenol and sodium metasilicate levels increased the mixing ease of the slurry and maintained good solids suspension.

TABLE 25

| Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 200° F.) 600 | 300 | 200 | 100 | 6 | 3 |
|---|---|---|---|---|---|---|---|---|---|---|---|---|---|---|---|---|---|---|
| RUN 1 | G | 15.8 | 4.89 | 80 | 1.05 | 0.6 | — | .25* | 0.2 | — | — | — | — | 170 | 89 | 62 | 33 | 4 | 2 |
| RUN 2 | G | 15.8 | 4.89 | 200 | 1.05 | 0.6 | — | .25* | 0.2 | 4.03 | 3.63 | — | 36 | 76 | 41 | 29 | 17 | 3 | 2 |

*Comments:
Duplication of previous test with the substitution of ethoxylated octylphenol.

TABLE 26

| | Cement Class | Den. PPG | Water GPS | Temp °F. | Additives DIS | PVA | LCA | Ethox Additive | SM | TFR 1 | 2 | TT HRS | FL MLS | Rheology (Fann Viscometer at 80 and 200° F.) 600 | 300 | 200 | 100 | 6 | 3 |
|---|---|---|---|---|---|---|---|---|---|---|---|---|---|---|---|---|---|---|---|
| RUN 1 | G | 15.8 | 4.89 | 80 | 1.05 | 0.6 | — | .25* | 0.2 | — | — | — | — | 170 | 91 | 64 | 34 | 4 | 3 |
| RUN 2 | G | 15.8 | 4.89 | 200 | 1.05 | 0.6 | — | .25* | 0.2 | 3.73 | 3.37 | — | 31 | 71 | 38 | 27 | 15 | 3 | 2 |

*Comments:
Duplication of above test with the substitution of ethoxylated fatty alcohol.

TABLE 27

| | Cement Class | Den. PPG | Water GPS | Temp °F. | Additives DIS | FLA | FLB | Ethox Additive | TT HRS | FL MLS | Rheology (Fann Viscometer at 80 and 175° F.) 600 | 300 | 200 | 100 | 6 | 3 |
|---|---|---|---|---|---|---|---|---|---|---|---|---|---|---|---|---|
| RUN 1 | G | 15.8 | 4.89 | 80 | 1 | 0.4 | — | — | — | — | 141 | 72 | 58 | 43 | 31 | 28 |
| RUN 2 | G | 15.8 | 4.89 | 175 | 1 | 0.4 | — | — | — | 104 | 86 | 41 | 27 | 14 | 2 | 1 |

TABLE 28

| | Cement Class | Den. PPG | Water GPS | Temp °F. | Additives DIS | FLA | FLB | Ethox Additive | TT HRS | FL MLS | Rheology (Fann Viscometer at 80 and 175° F.) 600 | 300 | 200 | 100 | 6 | 3 |
|---|---|---|---|---|---|---|---|---|---|---|---|---|---|---|---|---|
| RUN 1 | G | 15.8 | 4.89 | 80 | 1 | 0.4 | — | 0.2* | — | — | 125 | 64 | 45 | 25 | 3 | 2 |
| RUN 2 | G | 15.8 | 4.89 | 175 | 1 | 0.4 | — | 0.2* | — | 172 | 79 | 40 | 28 | 15 | 2 | 1 |

*Comment: Additive of 0.2% ethoxylated nonylphenol.

TABLE 29

| | Cement Class | Den. PPG | Water GPS | Temp °F. | Additives DIS | FLA | FLB | Ethox Additive | TT HRS | FL MLS | Rheology (Fann Viscometer at 80 and 175° F.) 600 | 300 | 200 | 100 | 6 | 3 |
|---|---|---|---|---|---|---|---|---|---|---|---|---|---|---|---|---|
| RUN 1 | G | 15.8 | 4.89 | 80 | 1 | 0.4 | — | 0.2* | — | — | 123 | 63 | 44 | 24 | 3 | 2 |
| RUN 2 | G | 15.8 | 4.89 | 175 | 1 | 0.4 | — | 0.2* | — | 146 | 68 | 33 | 22 | 11 | 2 | 1 |

*Comment: Addition of 0.2% ethoxylated fatty alcohol.

TABLE 30

| | Cement Class | Den. PPG | Water GPS | Temp °F. | Additives DIS | FLA | FLB | Ethox Additive | TT HRS | FL MLS | Rheology (Fann Viscometer at 80 and 175° F.) 600 | 300 | 200 | 100 | 6 | 3 |
|---|---|---|---|---|---|---|---|---|---|---|---|---|---|---|---|---|
| RUN 1 | G | 15.8 | 4.89 | 80 | 1 | — | 0.4 | — | — | — | 155 | 101 | 82 | 56 | 38 | 34 |
| RUN 2 | G | 15.8 | 4.89 | 175 | 1 | — | 0.4 | — | — | 319 | 74 | 38 | 27 | 15 | 2 | 2 |

TABLE 31

| | Cement Class | Den. PPG | Water GPS | Temp °F. | Additives DIS | FLA | FLB | Ethox Additive | TT HRS | FL MLS | Rheology (Fann Viscometer at 80 and 175° F.) 600 | 300 | 200 | 100 | 6 | 3 |
|---|---|---|---|---|---|---|---|---|---|---|---|---|---|---|---|---|
| RUN 1 | G | 15.8 | 4.89 | 80 | 1 | — | 0.4 | 0.2* | — | — | 125 | 66 | 47 | 26 | 4 | 3 |
| RUN 2 | G | 15.8 | 4.89 | 175 | 1 | — | 0.4 | 0.2* | — | 105 | 60 | 30 | 21 | 11 | 2 | 1 |

*Comment: Addition of 0.2% ethoxylated nonylphenol.

TABLE 32

| | Cement Class | Den. PPG | Water GPS | Temp °F. | Additives DIS | FLA | FLB | Ethox Additive | TT HRS | FL MLS | Rheology (Fann Viscometer at 80 and 175° F.) 600 | 300 | 200 | 100 | 6 | 3 |
|---|---|---|---|---|---|---|---|---|---|---|---|---|---|---|---|---|
| RUN 1 | G | 15.8 | 4.89 | 80 | 1 | — | 0.4 | 0.2* | — | — | 114 | 59 | 40 | 22 | 3 | 2 |
| RUN 2 | G | 15.8 | 4.89 | 175 | 1 | — | 0.4 | 0.2* | — | 97 | 55 | 27 | 18 | 9 | 2 | 1 |

*Comment: Addition of 0.2% ethoxylated fatty alcohol.

TABLE 33

| | Cement Class | Den. PPG | Water GPS | Temp °F. | Additives DIS | FLC | LCA | Ethox Additive | TT HRS | FL MLS | Rheology (Fann Viscometer at 80 and 175° F.) 600 | 300 | 200 | 100 | 6 | 3 |
|---|---|---|---|---|---|---|---|---|---|---|---|---|---|---|---|---|
| RUN 1 | G | 15.8 | 4.89 | 80 | 1 | .25 | — | — | — | — | 87 | 45 | 32 | 18 | 4 | 4 |

TABLE 33-continued

| | Cement Class | Den. PPG | Water GPS | Temp °F. | Additives | | | | TT HRS | FL MLS | Rheology (Fann Viscometer at 80 and 175° F.) | | | | | |
|---|---|---|---|---|---|---|---|---|---|---|---|---|---|---|---|---|
| | | | | | DIS | FLC | LCA | Ethox Additive | | | 600 | 300 | 200 | 100 | 6 | 3 |
| RUN 2 | G | 15.8 | 4.89 | 175 | 1 | .25 | — | — | — | 245 | 66 | 37 | 28 | 17 | 5 | 6 |

TABLE 34

| | Cement Class | Den. PPG | Water GPS | Temp °F. | Additives | | | | TT HRS | FL MLS | Rheology (Fann Viscometer at 80 and 175° F.) | | | | | |
|---|---|---|---|---|---|---|---|---|---|---|---|---|---|---|---|---|
| | | | | | DIS | FLC | LCA | Ethox Additive | | | 600 | 300 | 200 | 100 | 6 | 3 |
| RUN 1 | G | 15.8 | 4.89 | 80 | 1 | .25 | — | 0.2* | — | — | 84 | 44 | 31 | 13 | 3 | 3 |
| RUN 2 | G | 15.8 | 4.89 | 175 | 1 | .25 | — | 0.2* | — | 209 | 57 | 31 | 22 | 13 | 3 | 3 |

*Comment: Addition of 0.2% ethoxylated nonylphenol.

TABLE 35

| | Cement Class | Den. PPG | Water GPS | Temp °F. | Additives | | | | TT HRS | FL MLS | Rheology (Fann Viscometer at 80 and 175° F.) | | | | | |
|---|---|---|---|---|---|---|---|---|---|---|---|---|---|---|---|---|
| | | | | | DIS | FLC | LCA | Ethox Additive | | | 600 | 300 | 200 | 100 | 6 | 3 |
| RUN 1 | G | 15.8 | 4.89 | 80 | 1 | .25 | — | 0.2* | — | — | 89 | 45 | 31 | 17 | 3 | 2 |
| RUN 2 | G | 15.8 | 4.89 | 175 | 1 | .25 | — | 0.2* | — | 201 | 53 | 27 | 19 | 10 | 2 | 2 |

*Comment: Addition of 0.2% ethoxylated fatty alcohol.

TABLE 36

| | Cement Class | Den. PPG | Water GPS | Temp °F. | Additives | | | | | |
|---|---|---|---|---|---|---|---|---|---|---|
| | | | | | DIS | PVA | LCA | Ethox Additive | KCl | NaCl |
| RUN 1 | G | 15.8 | 4.98 | 80 | .95 | 0.6 | — | 0.2* | 3 | — |
| RUN 2 | G | 15.8 | 4.98 | 175 | .95 | 0.6 | — | 0.2* | 3 | — |

| | TFR | | TT HRS | FL MLS | Rheology (Fann Viscometer at 80 and 175° F.) | | | | | |
|---|---|---|---|---|---|---|---|---|---|---|
| | 1 | 2 | | | 600 | 300 | 200 | 100 | 6 | 3 |
| RUN 1 | — | — | — | — | 149 | 78 | 55 | 31 | 4 | 3 |
| RUN 2 | 2.47 | 2.43 | — | 22 | 53 | 27 | 19 | 10 | 2 | 2 |

*Comment: Addition of 0.2% ethoxylated nonylphenol.

TABLE 37

| | Cement Class | Den. PPG | Water GPS | Temp °F. | Additives | | | | | |
|---|---|---|---|---|---|---|---|---|---|---|
| | | | | | DIS | PVA | LCA | Ethox Additive | KCl | NaCl |
| RUN 1 | G | 15.8 | 4.96 | 80 | .95 | 0.6 | — | 0.2* | — | 3 |
| RUN 2 | G | 15.8 | 4.96 | 175 | .95 | 0.6 | — | 0.2* | — | 3 |

| | TFR | | TT HRS | FL MLS | Rheology (Fann Viscometer at 80 and 175° F.) | | | | | |
|---|---|---|---|---|---|---|---|---|---|---|
| | 1 | 2 | | | 600 | 300 | 200 | 100 | 6 | 3 |
| RUN 1 | — | — | — | — | 156 | 85 | 60 | 33 | 5 | 4 |
| RUN 2 | 2.87 | 2.78 | — | 18 | 60 | 31 | 22 | 12 | 2 | 2 |

*Comment: Addition of 0.2% ethoxylated nonylphenol.

TABLE 38

| | Cement Class | Den. PPG | Water GPS | Temp °F. | Additives | | | | | |
|---|---|---|---|---|---|---|---|---|---|---|
| | | | | | DIS | PVA | LCA | Ethox Additive | KCl | NaCl |
| RUN 1 | G | 15.8 | 5.02 | 80 | .85 | 0.6 | — | 0.2* | — | 6 |
| RUN 2 | G | 15.8 | 5.02 | 175 | .85 | 0.6 | — | 0.2* | — | 6 |

| | TFR | | TT HRS | FL MLS | Rheology (Fann Viscometer at 80 and 175° F.) | | | | | |
|---|---|---|---|---|---|---|---|---|---|---|
| | 1 | 2 | | | 600 | 300 | 200 | 100 | 6 | 3 |
| RUN 1 | — | — | — | — | 178 | 105 | 82 | 54 | 25 | 23 |
| RUN 2 | 2.96 | 2.93 | — | 178 | 64 | 33 | 23 | 13 | 3 | 3 |

*Comment: Addition of 0.2% ethoxylated nonylphenol.

TABLE 39

Additives

TABLE 39-continued

| | Cement Class | Den. PPG | Water GPS | Temp °F. | DIS | PVA | LCA | Ethox Additive | KCl | NaCl |
|---|---|---|---|---|---|---|---|---|---|---|
| RUN 1 | G | 15.8 | 5.00 | 80 | .95 | .65 | | 0.4* | — | 6 |
| RUN 2 | G | 15.8 | 5.00 | 175 | .95 | .65 | | 0.4* | — | 6 |

| | TFR | | TT | FL | Rheology (Fann Viscometer at 80 and 175° F.) | | | | | |
|---|---|---|---|---|---|---|---|---|---|---|
| | 1 | 2 | HRS | MLS | 600 | 300 | 200 | 100 | 6 | 3 |
| RUN 1 | — | — | — | — | 143 | 68 | 50 | 29 | 7 | 7 |
| RUN 2 | 3.32 | 3.23 | — | 48 | 70 | 37 | 25 | 14 | 3 | 3 |

*Comment: Addition of 0.4% ethoxylated nonylphenol.

TABLE 40

| | Cement Class | Den. PPG | Water GPS | Temp °F. | Additives | | | | | |
|---|---|---|---|---|---|---|---|---|---|---|
| | | | | | DIS | PVA | LCA | Ethox Additive | KCl | NaCl |
| RUN 1 | G | 15.8 | 5.08 | 80 | .95 | .65 | — | 0.4* | — | 10 |
| RUN 2 | G | 15.8 | 5.08 | 175 | .95 | .65 | — | 0.4* | — | 10 |

| | TFR | | TT | FL | Rheology (Fann Viscometer at 80 and 175° F.) | | | | | |
|---|---|---|---|---|---|---|---|---|---|---|
| | 1 | 2 | HRS | MLS | 600 | 300 | 200 | 100 | 6 | 3 |
| RUN 1 | — | — | — | — | 94 | 48 | 34 | 20 | 4 | 4 |
| RUN 2 | 2.09 | 2.26 | — | 705 | 50 | 24 | 17 | 10 | 3 | 3 |

*Comment: Addition of 0.4% ethoxylated nonylphenol.

TABLE 41

| | Cement Class | Den. PPG | Water GPS | Temp °F. | Additives | | | | TFR | |
|---|---|---|---|---|---|---|---|---|---|---|
| | | | | | DIS | HEC | CMHEC | Ethox Additive | 1 | 2 |
| RUN 1 | G | 15.8 | 4.89 | 80 | 1.5 | .25 | — | — | — | — |
| RUN 2 | G | 15.8 | 4.89 | 175 | 1.5 | .25 | — | — | — | — |

| | TT | FL | Rheology (Fann Viscometer at 80 and 175° F.) | | | | | |
|---|---|---|---|---|---|---|---|---|
| | HRS | MLS | 600 | 300 | 200 | 100 | 6 | 3 |
| RUN 1 | — | — | 171 | 88 | 73 | 56 | 42 | 37 |
| RUN 2 | — | 260 | 91 | 56 | 49 | 39 | 29 | 19 |

TABLE 42

| | Cement Class | Den. PPG | Water GPS | Temp °F. | Additives | | | | TFR | |
|---|---|---|---|---|---|---|---|---|---|---|
| | | | | | DIS | HEC | CMHEC | Ethox Additive | 1 | 2 |
| RUN 1 | G | 15.8 | 4.89 | 80 | 1.5 | .25 | — | 0.2* | — | — |
| RUN 2 | G | 15.8 | 4.89 | 175 | 1.5 | .25 | — | 0.2* | — | — |

| | TT | FL | Rheology (Fann Viscometer at 80 and 175° F.) | | | | | |
|---|---|---|---|---|---|---|---|---|
| | HRS | MLS | 600 | 300 | 200 | 100 | 6 | 3 |
| RUN 1 | — | — | 194 | 102 | 71 | 39 | 5 | 3 |
| RUN 2 | — | 95 | 81 | 49 | 35 | 20 | 3 | 2 |

*Comment: Addition of 0.2% ethoxylated nonylphenol.

TABLE 43

| | Cement Class | Den. PPG | Water GPS | Temp °F. | Additives | | | | TFR | |
|---|---|---|---|---|---|---|---|---|---|---|
| | | | | | DIS | HEC | CMHEC | Ethox Additive | 1 | 2 |
| RUN 1 | G | 15.8 | 4.89 | 80 | 1.5 | .25 | — | 0.2* | — | — |
| RUN 2 | G | 15.8 | 4.89 | 175 | 1.5 | .25 | — | 0.2* | — | — |

| | TT | FL | Rheology (Fann Viscometer at 80 and 175° F.) | | | | | |
|---|---|---|---|---|---|---|---|---|
| | HRS | MLS | 600 | 300 | 200 | 100 | 6 | 3 |
| RUN 1 | — | — | 180 | 98 | 69 | 37 | 4 | 3 |
| RUN 2 | — | 81 | 67 | 35 | 24 | 13 | 2 | 2 |

*Comment: Addition of 0.2% ethoxylated fatty alcohol.

TABLE 44

| | Cement Class | Den. PPG | Water GPS | Temp °F. | Additives DIS | HEC | CMHEC | Ethox Additive | TFR 1 | 2 |
|---|---|---|---|---|---|---|---|---|---|---|
| RUN 1 | G | 15.8 | 4.89 | 80 | 1.5 | — | .25 | — | — | — |
| RUN 2 | G | 15.8 | 4.89 | 175 | 1.5 | — | .25 | — | — | — |

| | | | TT HRS | FL MLS | Rheology (Fann Viscometer at 80 and 175° F.) 600 | 300 | 200 | 100 | 6 | 3 |
|---|---|---|---|---|---|---|---|---|---|---|
| RUN 1 | | | — | — | 115 | 67 | 50 | 33 | 12 | 12 |
| RUN 2 | | | — | 98 | 57 | 28 | 19 | 10 | 2 | 1 |

TABLE 45

| | Cement Class | Den. PPG | Water GPS | Temp °F. | Additives DIS | HEC | CMHEC | Ethox Additive | TFR 1 | 2 |
|---|---|---|---|---|---|---|---|---|---|---|
| RUN 1 | G | 15.8 | 4.89 | 80 | 1.5 | — | .25 | 0.2* | — | — |
| RUN 2 | G | 15.8 | 4.89 | 175 | 1.5 | — | .25 | 0.2* | — | — |

| | | | TT HRS | FL MLS | Rheology (Fann Viscometer at 80 and 175° F.) 600 | 300 | 200 | 100 | 6 | 3 |
|---|---|---|---|---|---|---|---|---|---|---|
| RUN 1 | | | — | — | 110 | 59 | 41 | 24 | 4 | 3 |
| RUN 2 | | | — | 126 | 62 | 32 | 22 | 12 | 2 | 1 |

*Comment: Addition of 0.2% ethoxylated nonylphenol.

TABLE 46

| | Cement Class | Den. PPG | Water GPS | Temp °F. | Additives PVA | HEC | CMHEC | Ethox Additive | TFR 1 | 2 |
|---|---|---|---|---|---|---|---|---|---|---|
| RUN 1 | G | 15.8 | 4.89 | 80 | 1.5 | — | .25 | 0.2* | — | — |
| RUN 2 | G | 15.8 | 4.89 | 175 | 1.5 | — | .25 | 0.2* | — | — |

| | | | TT HRS | FL MLS | Rheology (Fann Viscometer at 80 and 175° F.) 600 | 300 | 200 | 100 | 6 | 3 |
|---|---|---|---|---|---|---|---|---|---|---|
| RUN 1 | | | — | — | 126 | 65 | 45 | 25 | 3 | 2 |
| RUN 2 | | | — | 104 | 55 | 27 | 18 | 9 | 2 | 1 |

*Comment: Addition of 0.2% ethoxylated fatty alcohol.

TABLE 47

| | Cement Class | Den. PPG | Water GPS | Temp °F. | Additives PVA | DIS | AC | Ethox Additive | TFR 1 | 2 |
|---|---|---|---|---|---|---|---|---|---|---|
| RUN 1 | H | 16.2 | 4.56 | 80 | 0.7 | 0.4 | 0.2 | — | — | — |
| RUN 2 | H | 16.2 | 4.56 | 150 | 0.7 | 0.4 | 0.2 | — | 8.08 | 7.57 |

| | | | TT HRS | FL MLS | Rheology (Fann Viscometer at 80 and 150° F.) 600 | 300 | 200 | 100 | 6 | 3 |
|---|---|---|---|---|---|---|---|---|---|---|
| RUN 1 | | | — | — | 246 | 139 | 95 | 49 | 5 | 4 |
| RUN 2 | | | 3:28 | 466 | 154 | 99.5 | 77 | 50 | 26 | 21 |

Comment: The slurry completely closed vortex at low speed before all cement was added. After about 10 seconds the vortex returned and mixing was completed.

TABLE 48

| | Cement Class | Den. PPG | Water GPS | Temp °F. | Additives PVA | DIS | AC | Ethox Additive | TFR 1 | 2 |
|---|---|---|---|---|---|---|---|---|---|---|
| RUN 1 | H | 16.2 | 4.56 | 80 | 0.7 | 0.4 | 0.2 | 0.2* | — | — |
| RUN 2 | H | 16.2 | 4.56 | 150 | 0.7 | 0.4 | 0.2 | 0.2* | 5.06 | 4.99 |

| | | | TT HRS | FL MLS | Rheology (Fann Viscometer at 80 and 150° F.) 600 | 300 | 200 | 100 | 6 | 3 |
|---|---|---|---|---|---|---|---|---|---|---|
| RUN 1 | | | — | — | 249 | 140 | 97 | 51 | 5 | 4 |
| RUN 2 | | | 3:29 | 38 | 119 | 59 | 41.5 | 23 | 4 | 3.5 |

TABLE 49

| | Cement Class | Den. PPG | Water GPS | Temp °F. | Additives PVA | DIS | AC | Ethox Additive | TFR 1 | TFR 2 |
|---|---|---|---|---|---|---|---|---|---|---|
| RUN 1 | H | 16.2 | 4.56 | 80 | 0.7 | 0.4 | 0.2 | 0.2* | — | — |
| RUN 2 | H | 16.2 | 4.56 | 150 | 0.7 | 0.4 | 0.2 | 0.2* | 5.47 | 4.88 |

| | TT HRS | FL MLS | Rheology (Fann Viscometer at 80 and 150° F.) 600 | 300 | 200 | 100 | 6 | 3 |
|---|---|---|---|---|---|---|---|---|
| RUN 1 | — | — | 232 | 128 | 88 | 45.5 | 4 | 3 |
| RUN 2 | — | 34 | 111.5 | 58 | 40 | 22 | 4 | 3.5 |

*Comment: Addition of 0.2% polyoxyethylene (15) talloamine.

TABLE 50

| | Cement Class | Den. PPG | Water GPS | Temp °F. | Additives PVA | DIS | AC | Ethox Additive | TFR 1 | TFR 2 |
|---|---|---|---|---|---|---|---|---|---|---|
| RUN 1 | H | 16.2 | 4.56 | 80 | 0.7 | 0.4 | 0.2 | 0.2* | — | — |
| RUN 2 | H | 16.2 | 4.56 | 150 | 0.7 | 0.4 | 0.2 | 0.2* | 5.56 | 4.97 |

| | TT HRS | FL MLS | Rheology (Fann Viscometer at 80 and 150° F.) 600 | 300 | 200 | 100 | 6 | 3 |
|---|---|---|---|---|---|---|---|---|
| RUN 1 | — | — | 234 | 126 | 87 | 45 | 4 | 2.5 |
| RUN 2 | — | 29 | 112 | 59 | 41 | 22.5 | 4 | 4 |

*Comment: Addition of 0.2% polyoxyethylene (10) aliphatic N-tallow-1,3-diaminpropane.

TABLE 51

| | Cement Class | Den. PPG | Water GPS | Temp °F. | Additives PVA | DIS | AC | Ethox Additive | TFR 1 | TFR 2 |
|---|---|---|---|---|---|---|---|---|---|---|
| RUN 1 | H | 16.2 | 4.56 | 80 | 0.7 | 0.4 | 0.2 | 0.2* | — | — |
| RUN 2 | H | 16.2 | 4.56 | 150 | 0.7 | 0.4 | 0.2 | 0.2* | 5.25 | 4.88 |

| | TT HRS | FL MLS | Rheology (Fann Viscometer at 80 and 150° F.) 600 | 300 | 200 | 100 | 6 | 3 |
|---|---|---|---|---|---|---|---|---|
| RUN 1 | — | — | 235 | 126 | 87 | 45 | 4 | 2.5 |
| RUN 2 | — | 297 | 113 | 59.5 | 43 | 26 | 9 | 9.5 |

*Comment: Addition of 0.2% polyoxyethylene (1) glycol oleate.

TABLE 52

| | Cement Class | Den. PPG | Water GPS | Temp °F. | PVA | DIS | AC | Ethox Additive | TFR 1 | TFR 2 | TT HRS | FL MLS | 600 | 300 | 200 | 100 | 6 | 3 |
|---|---|---|---|---|---|---|---|---|---|---|---|---|---|---|---|---|---|---|
| RUN 1 | H | 16.2 | 4.56 | 80 | 0.7 | 0.4 | 0.2 | 0.2* | — | — | — | — | 212 | 117.5 | 82 | 43 | 5 | 4 |
| RUN 2 | H | 16.2 | 4.56 | 150 | 0.7 | 0.4 | 0.2 | 0.2* | 5.59 | 5.00 | — | 50 | 114.5 | 59.5 | 41.5 | 23 | 4.5 | 4 |

*Comments: Addition of 0.2% polyoxyethylene (10) cocoamine.

TABLE 53

| | Cement Class | Den. PPG | Water GPS | Temp °F. | PVA | DIS | AC | Ethox Additive | TFR 1 | TFR 2 | TT HRS | FL MLS | 600 | 300 | 200 | 100 | 6 | 3 |
|---|---|---|---|---|---|---|---|---|---|---|---|---|---|---|---|---|---|---|
| RUN 1 | H | 16.2 | 4.56 | 80 | 0.7 | 0.4 | 0.2 | 0.2* | — | — | — | — | 227 | 124 | 85 | 44 | 4 | 2.5 |
| RUN 2 | H | 16.2 | 4.56 | 150 | 0.7 | 0.4 | 0.2 | 0.2* | 5.52 | 4.95 | — | 34 | 114.5 | 59 | 41.5 | 23 | 5 | 4.5 |

*Comments: Addition of 0.2% polyoxyethylene (10) octadecylamine.

TABLE 54

| | Cement Class | Den. PPG | Water GPS | Temp °F. | PVA | DIS | AC | Ethox Additive | TFR 1 | TFR 2 | TT HRS | FL MLS | 600 | 300 | 200 | 100 | 6 | 3 |
|---|---|---|---|---|---|---|---|---|---|---|---|---|---|---|---|---|---|---|
| RUN 1 | H | 16.2 | 4.56 | 80 | 0.7 | 0.4 | 0.2 | 0.2* | — | — | — | — | 224 | 123 | 84 | 44 | 4 | 2.5 |
| RUN 2 | H | 16.2 | 4.56 | 150 | 0.7 | 0.4 | 0.2 | 0.2* | 5.45 | 4.88 | — | 28 | 110.5 | 58 | 40.5 | 22.5 | 4.5 | 4 |

*Comments: Addition of 0.2% polyoxyethylene (10) soyamine.

TABLE 55

| | Cement Class | Den. PPG | Water GPS | Temp °F. | Additives PVA | DIS | AC | Ethox Additive | TFR 1 | 2 | TT HRS | FL MLS | Rheology (Fann Viscometer at 80 and 150° F.) 600 | 300 | 200 | 100 | 6 | 3 |
|---|---|---|---|---|---|---|---|---|---|---|---|---|---|---|---|---|---|---|
| RUN 1 | H | 16.2 | 4.56 | 80 | 0.7 | 0.4 | 0.2 | 0.2* | — | — | — | — | 229 | 122 | 84.5 | 44 | 3.5 | 2.5 |
| RUN 2 | H | 16.2 | 4.56 | 150 | 0.7 | 0.4 | 0.2 | 0.2* | 5.16 | 4.51 | 3:32 | 24 | 106 | 54.5 | 38 | 21 | 3.5 | 3.5 |

*Comments: Polyoxyethylene (15) aliphatic oleylamine.

TABLE 56

| | Cement Class | Den. PPG | Water GPS | Temp °F. | Additives PVA | DIS | AC | Ethox Additive | TFR 1 | 2 | TT HRS | FL MLS | Rheology (Fann Viscometer at 80 and 150° F.) 600 | 300 | 200 | 100 | 6 | 3 |
|---|---|---|---|---|---|---|---|---|---|---|---|---|---|---|---|---|---|---|
| RUN 1 | H | 16.2 | 4.56 | 80 | 0.7 | 0.4 | 0.2 | 0.2* | — | — | — | — | 232 | 129 | 88.5 | 47 | 5 | 3.5 |
| RUN 2 | H | 16.2 | 4.56 | 150 | 0.7 | 0.4 | 0.2 | 0.2* | 6.06 | 5.42 | — | 222 | 121 | 65 | 45 | 26 | 5 | 5 |

*Comments: Addition of 0.2% methylpolyoxyethylene (15) cocoammonium chloride.

TABLE 57

| | Cement Class | Den. PPG | Water GPS | Temp °F. | Additives PVA | DIS | AC | Ethox Additive | TFR 1 | 2 | TT HRS | FL MLS | Rheology (Fann Viscometer at 80 and 150° F.) 600 | 300 | 200 | 100 | 6 | 3 |
|---|---|---|---|---|---|---|---|---|---|---|---|---|---|---|---|---|---|---|
| RUN 1 | H | 16.2 | 4.56 | 80 | 0.7 | 0.4 | 0.2 | 0.2* | — | — | — | — | 248 | 133 | 91.5 | 47.5 | 3 | 2 |
| RUN 2 | H | 16.2 | 4.56 | 150 | 0.7 | 0.4 | 0.2 | 0.2* | 5.58 | 4.97 | — | 55 | 116 | 58.5 | 41 | 22.5 | 2 | 2 |

*Comments: Addition of 0.2% methylpolyoxyethylene (15) octadecylammonium chloride.

TABLE 58

| | Cement Class | Den. PPG | Water GPS | Temp °F. | Additives PVA | DIS | AC | Ethox Additive | TFR 1 | 2 | TT HRS | FL MLS | Rheology (Fann Viscometer at 80 and 150° F.) 600 | 300 | 200 | 100 | 6 | 3 |
|---|---|---|---|---|---|---|---|---|---|---|---|---|---|---|---|---|---|---|
| RUN 1 | H | 16.2 | 4.56 | 80 | 0.7 | 0.4 | 0.2 | 0.2* | — | — | — | — | 229.5 | 123 | 84 | 43.5 | 4.5 | 3 |
| RUN 2 | H | 16.2 | 4.56 | 150 | 0.7 | 0.4 | 0.2 | 0.2* | 5.04 | 4.50 | 3:08 | 46 | 107.5 | 53 | 37 | 20 | 3.5 | 3 |

*Comments: Addition of 0.2% methylpolyoxyethylene (15) oleylammonium chloride.

TABLE 59

| | Cement Class | Den. PPG | Water GPS | Temp °F. | Additives PVA | DIS | AC | Ethox Additive | TFR 1 | 2 | TT HRS | FL MLS | Rheology (Fann Viscometer at 80 and 150° F.) 600 | 300 | 200 | 100 | 6 | 3 |
|---|---|---|---|---|---|---|---|---|---|---|---|---|---|---|---|---|---|---|
| RUN 1 | H | 16.2 | 4.56 | 80 | 0.7 | 0.4 | 0.2 | 0.2* | — | — | — | — | 262 | 149.5 | 102 | 53.5 | 4.5 | 3 |
| RUN 2 | H | 16.2 | 4.56 | 150 | 0.7 | 0.4 | 0.2 | 0.2* | 5.30 | 4.77 | 3:06 | 55 | 107 | 57 | 39.5 | 22.5 | 5 | 4.5 |

*Comments: Addition of 0.2% polyoxyethylene (7) oleamide.

TABLE 60

| | Cement Class | Den. PPG | Water GPS | Temp °F. | Additives PVA | DIS | AC | Ethox Additive | FLD | FLE |
|---|---|---|---|---|---|---|---|---|---|---|
| RUN 1 | H | 16.2 | 4.56 | 80 | 0.7 | 0.4 | 0.2 | — | — | — |
| RUN 2 | H | 16.2 | 4.56 | 150 | 0.7 | 0.4 | 0.2 | — | — | — |

| | TFR 1 | 2 | TT HRS | FL MLS | Rheology (Fann Viscometer at 80 and 150°F.) 600 | 300 | 200 | 100 | 6 | 3 |
|---|---|---|---|---|---|---|---|---|---|---|
| RUN 1 | — | — | — | — | 246 | 139 | 95 | 49 | 5 | 4 |
| RUN 2 | 8.08 | 7.57 | — | 466 | 154 | 99.5 | 77 | 50 | 26 | 21 |

TABLE 61

| | Cement Class | Den. PPG | Water GPS | Temp °F. | Additives PVA | DIS | AC | Ethox Additive | FLD | FLE |
|---|---|---|---|---|---|---|---|---|---|---|
| RUN 1 | H | 16.2 | 4.56 | 80 | 0.7 | — | 0.2 | — | 0.4 | — |
| RUN 2 | H | 16.2 | 4.56 | 150 | 0.7 | — | 0.2 | — | — | — |

| | TFR 1 | 2 | TT HRS | FL MLS | Rheology (Fann Viscometer at 80 and 150°F.) 600 | 300 | 200 | 100 | 6 | 3 |
|---|---|---|---|---|---|---|---|---|---|---|
| RUN 1 | — | — | — | — | 255 | 134 | 93 | 49 | 4 | 2 |

TABLE 61-continued

| | | | | | | | | | | |
|---|---|---|---|---|---|---|---|---|---|---|
| RUN 2 | 4.82 | 4.28 | — | 71 | 107 | 50 | 35 | 19 | 2.5 | 2 |

TABLE 62

| | Cement Class | Den. PPG | Water GPS | Temp °F. | Additives | | | | | |
| | | | | | PVA | DIS | AC | Ethox Additive | FLD | FLE |
|---|---|---|---|---|---|---|---|---|---|---|
| RUN 1 | H | 16.2 | 4.56 | 80 | 0.7 | — | 0.2 | — | — | 0.4 |
| RUN 2 | H | 16.2 | 4.56 | 150 | 0.7 | — | 0.2 | — | — | — |

| | TFR | | TT | FL | Rheology (Fann Viscometer at 80 and 150°F.) | | | | | |
| | 1 | 2 | HRS | MLS | 600 | 300 | 200 | 100 | 6 | 3 |
|---|---|---|---|---|---|---|---|---|---|---|
| RUN 1 | — | — | — | — | 278 | 146 | 103 | 56 | 8 | 6 |
| RUN 2 | 5.88 | 5.26 | — | 212 | 114 | 63 | 44 | 24 | 5 | 5 |

An invention has been provided with several advantages. The intensifier additive package of the invention can be used with other water soluble polymers to provide a cement slurry with desirable fluid loss and dispersive characteristics over a wide range of temperatures. The intensifier package provides greatly improved results over the use of polyoxyethylene (n) fatty alkylamines, ethoxylated alkyl phenols, ethoxylated fatty alcohols, sulfonated dispersant type materials, and the like.

While the invention has been shown in only one of its forms, it is not thus limited but is susceptible to various changes and modifications without departing from the spirit thereof.

I claim:

1. A method of cementing a well bore, comprising the steps of:
   mixing together a hydraulic cement, water in an amount to produce a pumpable slurry, and an intensifier package comprising a blend of an ethoxylated surfactant and a sulfonated dispersant material, the intensifier package being present in the range from about 0.1 to 3.0%, based on the weight of hydraulic cement;
   pumping said cement slurry to the desired location in said well bore; and
   allowing said cement slurry to harden to a solid mass;
   wherein the ethoxylated surfactant is selected from the group consisting of ethoxylated alkylphenols, ethoxylated fatty alcohols, ethoxylated amines, ethoxylated amides, ethoxylated fatty acids, ethoxylated diamines and ethoxylated quarternary ammonium chlorides; and
   wherein the low molecular weight sulfonated dispersant material is an anionic surface active agent of the sulfonated type, comprising a salt of naphthalene sulfonic acid condensed with formaldehyde, having a molecular weight between about 1000 and 10,000.

2. A method of cementing a well bore, comprising the steps of:
   mixing together a hydraulic cement, water in an amount to produce a pumpable slurry, and an intensifier package comprising a blend of an ethoxylated surfactant and a sulfonated dispersant material, the intensifier package being present in the range from about 0.1 to 3.0%, based on the weight of hydraulic cement;
   pumping said cement slurry to the desired location in said well bore;
   allowing said cement slurry to harden to a solid mass;
   wherein the ethoxylated surfactant is selected from the group consisting of ethoxylated alkylphenols, ethoxylated fatty alcohols, ethoxylated amines, ethoxylated amides, ethoxylated fatty acids, ethoxylated diamines and ethoxylated quarternary ammonium chlorides; and
   wherein the low molecular weight sulfonated dispersant material is the sodium salt of naphthalene sulfonic acid condensed with formaldehyde, having a molecular weight between about 1000 and 10,000.

3. The method of claim 2, wherein the ethoxylated surfactant is ethoxylated nonylphenol present in the range from about 0.1 to 1%, based on the weight of cement.

4. The method of claim 2, wherein the ethoxylated surfactant is ethoxylated octylphenol present in the range from about 0.1 to 1%, based on the weight of cement.

5. The method of claim 2, wherein the ethoxylated surfactant is ethoxylated fatty alcohol present in the range from about 0.1 to 1%, based on the weight of cement.

6. The method of claim 2, wherein the ethoxylated surfactant is polyoxyethylene (15) tallowamine present in the range from about 0.1 to 1%, based on the weight of cement.

7. The method of claim 2, wherein the ethoxylated surfactant is polyoxyethylene (10) aliphatic N-tallow-1, 3-diaminpropane present in the range from about 0.1 to 1%, based on the weight of cement.

8. The method of claim 2, wherein the ethoxylated surfactant is polyoxyethylene (1) glycol oleate present in the range from about 0.1 to 1%, based on the weight of cement.

9. The method of claim 2, wherein the ethoxylated surfactant is polyoxyethylene (10) cocoamine present in the range from about 0.1 to 1%, based on the weight of cement.

10. The method of claim 2, wherein the ethoxylated surfactant is polyoxyethylene (10) octadecylamine present in the range from about 0.1 to 1%, based on the weight of cement.

11. The method of claim 2, wherein the ethoxylated surfactant is polyoxyethylene (25) stearylamine present in the range from about 0.1 to 1.0% based on the weight of cement.

12. The method of claim 2, wherein the ethoxylated surfactant is polyoxyethylene (10) soyamine present in the range from about 0.1 to 1%, based on the weight of cement.

13. The method of claim 2, wherein the ethoxylated surfactant is methylpolyoxyethylene (15) cocoammonium chloride present in the range from about 0.1 to 1%, based on the weight of cement.

14. The method of claim 2, wherein the ethoxylated surfactant is methylpolyoxyethylene (15) octadecylammonium chloride present in the range from about 0.1 to 1%, based on the weight of cement.

15. The method of claim 2, wherein the ethoxylated surfactant is methylpolyoxyethylene (15) oleylammonium chloride present in the range from about 0.1 to 1%, based on the weight of cement.

16. The method of claim 2, wherein the ethoxylated surfactant is polyoxyethylene (7) oleamide present in the range from about 0.1 to 1%, based on the weight of cement.

17. The method of claim 2, wherein the intensifier package is used with a water soluble polymeric compound selected from the group consisting of hydroxyethyl cellulose, carboxymethylhydroxyethyl cellulose, polyvinyl alcohol, polyvinyl pyrollidone, copolymers and terpolymers of 2-acrylamindo, 2-methyl propane sulfonic acid/acrylamide/vinyl methyl acetamide, and mixtures thereof.

18. The method of claim 2, wherein sodium silicate is added to the slurry.

* * * * *